(12) United States Patent
Jeong et al.

(10) Patent No.: US 9,947,064 B2
(45) Date of Patent: Apr. 17, 2018

(54) IMAGE PHOTOGRAPHING APPARATUS AND METHOD FOR CONTROLLING THE SAME

(71) Applicant: SAMSUNG ELECTRONICS CO., LTD., Suwon-si, Gyeonggi-do (KR)

(72) Inventors: Jin-gu Jeong, Seongnam-si (KR); Hee-chul Han, Suwon-si (KR); Seung-ryong Jeon, Incheon (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/072,629

(22) Filed: Mar. 17, 2016

(65) Prior Publication Data

US 2017/0132790 A1   May 11, 2017

(30) Foreign Application Priority Data

Nov. 11, 2015 (KR) .................. 10-2015-0157996

(51) Int. Cl.
*H04N 5/228* (2006.01)
*G06T 1/00* (2006.01)
(Continued)

(52) U.S. Cl.
CPC .......... *G06T 1/0007* (2013.01); *G06T 7/0051* (2013.01); *G06T 15/205* (2013.01);
(Continued)

(58) Field of Classification Search
CPC ..... H04W 4/023; H04W 4/005; H04W 4/025; H04L 67/18; H04N 21/4126;
(Continued)

(56) References Cited

U.S. PATENT DOCUMENTS 9,182,221 B2    11/2015  Nakazato et al.
2008/0118143 A1*  5/2008  Gordon .............. G01B 11/2513
                                                        382/154
(Continued)

FOREIGN PATENT DOCUMENTS

JP    2013-019890    1/2013
KR  10-2011-0018696    2/2011
(Continued)

OTHER PUBLICATIONS

Search Report and Written Opinion dated Aug. 9, 2016 in counterpart International Patent Application No. PCT/KR2016/002718.

*Primary Examiner* — Trung Diep
(74) *Attorney, Agent, or Firm* — Nixon & Vanderhye, P.C.

(57) ABSTRACT

An image photographing apparatus and a method for controlling the image photographing apparatus are provided. The method includes outputting light so as to penetrate a projection and fall on an object, receiving first reflective light reflected from an object, obtaining a first image based on information of the first reflective light, controlling the projection using predetermined information to generate a controlled projection, receiving second reflective light using the controlled projection, obtaining a second image based on information of the second reflective light, and generating a depth map using the obtained first image and second image.

20 Claims, 15 Drawing Sheets

(51) Int. Cl.
*G06T 7/00* (2017.01)
*G06T 15/20* (2011.01)
*H04N 5/33* (2006.01)
*H04N 5/222* (2006.01)
*H04N 5/225* (2006.01)

(52) U.S. Cl.
CPC ......... *H04N 5/2226* (2013.01); *H04N 5/2256* (2013.01); *H04N 5/332* (2013.01)

(58) Field of Classification Search
CPC ..... H04N 21/440263; H04N 21/44218; H04N 5/23238
See application file for complete search history.

(56) References Cited

U.S. PATENT DOCUMENTS

| | | |
|---|---|---|
| 2011/0043609 A1 | 2/2011 | Choi et al. |
| 2012/0316820 A1 | 12/2012 | Nakazato et al. |
| 2013/0088575 A1* | 4/2013 | Park .................. G01B 11/2513 348/46 |
| 2015/0022644 A1 | 1/2015 | Appia |
| 2015/0381965 A1* | 12/2015 | Atanassov ......... H04N 5/23245 348/47 |

FOREIGN PATENT DOCUMENTS

| | | |
|---|---|---|
| KR | 10-2015-0090680 | 8/2015 |
| KR | 10-1541805 | 8/2015 |

* cited by examiner

IMAGE PHOTOGRAPHING APPARATUS AND METHOD FOR CONTROLLING THE SAME

CROSS-REFERENCE TO RELATED APPLICATION

This application is based on and claims priority under 35 U.S.C. § 119 to Korean Patent Application No. 10-2015-0157996, filed on Nov. 11, 2015, in the Korean Intellectual Property Office, the disclosure of which is incorporated by reference herein in its entirety.

BACKGROUND

1. Field

The present disclosure generally relates to an image photographing apparatus and a method for controlling the same, and for example, to an image photographing apparatus which generates a high-resolution depth map by obtaining a plurality of images for generating a depth map and a method for controlling the same.

2. Description of Related Art

In recent times, a method for obtaining a three-dimensional (3D) image using an image photographing apparatus has been developed. In order to obtain the 3D image, a depth map is necessary. The depth map refers to information representing a spatial distance and a distance between one point and the other point in a two-dimensional (2D) image.

In order to obtain a depth map, a Time of Flight (TOF) method and a Structured Light (SL) method are commonly used. The TOF method uses a time required for outputted light to be inputted after being reflected from an object. The SL method uses a pattern of light where the light being outputted so as to penetrate a projection is reflected from an object and inputted.

A depth map is generated in the manner that compensation is executed through a SW algorithm based on information on inputted reflective light. Generally, resolution of a depth map is determined according to a degree of precision of a light source in the TOF method and determined according to a shape of a projection in the SL method. The degree of precision of a light source or the shape of a projection involves a physical limit, and thus, causes inconvenience of low-resolution image.

Accordingly, there is an increasing need for a method of generating a high-resolution depth map overcoming the physical limit.

SUMMARY

The present disclosure is provided to address the aforementioned and other problems and disadvantages occurring in the related art, and an aspect of the present disclosure provides an image photographing apparatus which generates a high-resolution depth map using a plurality of images obtained through control of a shape of a projection and a method for controlling the same.

According to an example embodiment of the present disclosure, a method for controlling an image photographing apparatus is provided. The method includes outputting light so as to penetrate a projection, receiving first reflective light reflected from an object, obtaining a first image based on information of the first reflective light, controlling the projection using predetermined information to generate a controlled projection, receiving second reflective light using the controlled projection, obtaining a second image based on information of the second reflective light, and generating a depth map using the obtained first image and second image.

The projection may be formed of a material whose shape may be changed depending upon an electrical signal. In addition, the controlling the projection may include controlling a shape of the projection by adjusting strength of an electrical signal which flows on the projection.

The controlling the projection may include dividing the projection into a plurality of areas and controlling each of the plurality of areas using a different electrical signal.

The controlling the projection may include minutely controlling variation of the projection as resolution of a light input unit is increased.

The obtaining the first image may include obtaining the first image by comparing the information on the first reflective light with a location, pattern, and size of the projection. In addition, the obtaining the second image may include obtaining the second image by comparing the information on the second reflective light with a location, pattern, and size of the controlled projection.

The controlling the projection may include controlling the projection to correspond to a command for controlling the projection.

The information of the first reflective light may include one or more of a pattern of the first reflective light, a reflected position of the first reflective light, a time required for the first reflective light to be input after being reflected from the object.

The controlling the projection may include moving a location of the projection.

The projection may include a plurality of slits. In addition, the controlling the projection may include controlling the projection by adjusting one or more of a thickness of the plurality of slits and an angle of the projection for controlling an incident angle at which the output light falls into the plurality of slits.

The light may be infrared (IR) light.

According to an example embodiment of the present disclosure, an image photographing apparatus is provided. The apparatus includes a light output unit including light outputting circuitry configured to output light so as to penetrate a projection, a light input unit including light receiving circuitry configured to receive first reflective light reflected from an object and to receive second reflective light reflected from an object after penetrating a controlled projection, and a controller configured to obtain a first image based on information of the first reflective light, to control the projection using predetermined information, obtain a second image based on information of the second reflective light, and to generate a depth map using the obtained first image and second image.

The projection may be formed of a material whose shape may be changed depending upon an electrical signal. In addition, the controller may be configured to control a shape of the projection by adjusting strength of an electrical signal which flows on the projection.

The controller may be configured to divide the projection into a plurality of areas and control each of the plurality of areas using a different electrical signal.

The controller may be configured to control variation of the projection minutely as resolution of a light input unit increases.

The controller may be configured to obtain the first image by comparing the information on the first reflective light with a location, pattern, and size of the projection and to obtain the second image by comparing the information on the second reflective light with a location, pattern, and size of the controlled projection.

The controller may be configured to control the projection to correspond to a command for controlling the projection.

The information of the first reflective light may include one or more of a pattern of the first reflective light, a reflected position of the first reflective light, a time required for the first reflective light to be input after being reflected from the object.

The controller may be configured to move a location of the projection.

The projection may include a plurality of slits. In addition, the controller may be configured to control the projection by adjusting one or more of a thickness of the plurality of slits and an angle of the projection for controlling an incident angle at which the output light falls into the plurality of slits.

The light may be infrared (IR) light.

According to the above-described various example embodiments of the present disclosure, the image photographing apparatus may generate a high-resolution depth map.

BRIEF DESCRIPTION OF THE DRAWINGS

The above and/or other aspects of the present disclosure will be more apparent from the following detailed description, taken in conjunction with the accompanying drawings, in which like reference numerals refer to like elements, and wherein.

DETAILED DESCRIPTION

Figure 1:
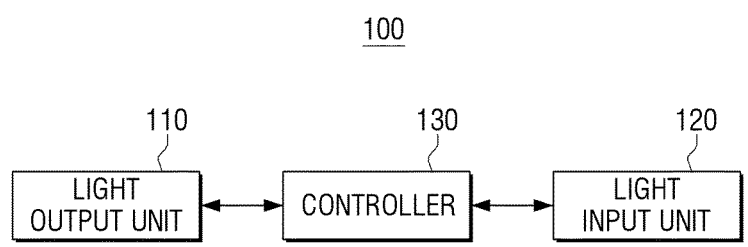
FIG. 1 is a block diagram illustrating an example structure of an image photographing apparatus.

Hereinafter, terms in the following description will be described briefly in advance of presenting a detailed description of example embodiments of the present disclosure.

The terms used in the present disclosure are widely used common expressions selected by considering functions in the following description. However, such terms may vary depending upon an intention of a person having ordinary skill in the art (hereinafter referred to as 'those skilled in the art'), a judicial precedent, or advent of new technology. In addition, some of the terms may have been selected arbitrarily, and a definition of the terms will be described in greater detail with respect to a corresponding example embodiment. Accordingly, the terms used in the following description should be defined based on the definition of the terms and overall descriptions of the example embodiments of the present disclosure.

In the following description, a term including an ordinal, for example, 'first' or 'second,' may be used to distinguish elements, but the elements are not limited by the ordinal. For example, the ordinal is used to only distinguish the same or similar elements. For example, the first element may be called the second element without deviating from the scope of right of the present disclosure, and vice versa. The term 'and/or' includes a combination of a plurality of related elements or a certain element among the plurality of related elements described herein.

A term in a singular form includes a plural form unless it is clear from the context of the description that the form is intentionally limited.

In the following description, the term 'include' or 'have' refers to the disclosed feature, number, step, operation, element, part, or combination thereof and is not intended to exclude any possibilities of existence or addition of one or more other features, numbers, steps, operations, elements, parts or combination thereof.

In the following description, the term 'module,' 'unit,' or 'part' refers to an element which performs at least one function or operation. The 'module,' 'unit,' or 'part' may be realized as hardware, firmware, software, or combination thereof. In addition, a plurality of 'modules,' 'units,' and 'parts' may be integrated into at least one module or chip such that it is realized as at least one processor except for a case where respective 'modules,' 'units,' and 'parts' need to be realized as discrete specific hardware.

When it is described that one part is connected to another part, the connection includes a 'direct' connection of the parts and an 'electrical' connection through another medium.

In the following description, an input may include at least one of a touch input, a bending input, a voice input, a button input, and a multimodal input, or the like, but is not limited thereto.

In the following description, an 'application' may refer, for example, to a series of computer program sets configured to perform a certain operation. In the example embodiments, various types of applications may be presented. For example, the application may include a game application, a video playback application, a map application, a memo application, a calendar application, a phone book application, a broadcast application, a fitness-support application, a payment application, a picture folder application, and the like, but is not limited thereto.

Unless otherwise defined, all terms used in the following description, including technical or scientific terms, have the same meaning as commonly being understood by those skilled in the art to which the present disclosure pertains. The terms defined in a common dictionary should be interpreted as the contextual meaning in the related art. Unless obviously defined that way herein, the terms should not be understood as having an ideal or excessively formal meaning.

Certain example embodiments are described in greater detail below with reference to the accompanying drawings. FIG. 1 is a block diagram illustrating an example structure of an image photographing apparatus. As illustrated in FIG. 1, an image photographing apparatus 100 includes a light output unit (e.g., including light outputting circuitry) 110, a light input unit (e.g., including light receiving circuitry) 120, and a controller (e.g., including processing circuitry) 130. According to an example embodiment, the image photographing apparatus 100 may be realized as various types of image photographing apparatuses, such as, a smart phone, a digital camera, camcorder, and the like, but is not limited thereto.

The light output unit 110 outputs light. For example, the light output unit 110 may output, for example, infrared (IR) light. The IR light may be light having a wavelength band greater than 800 nanometer (nm). The light output unit 110 may include at least one Laser Diode (LD) or Light Emitting Diode (LED) which projects the IR light. In addition, the light output unit 110 may include circuitry to modulate a pulse or a phase of outputted light, for example. Accordingly, the light output unit 110 may output the light with switching on or off a light source in certain intervals. The light output unit 110 may include, for example, a scanner for controlling an angle of light irradiated to an object. The light output unit 110 may, for example, rotate the scanner to irradiate the light to a surface of an object.

The light input unit 120 receives reflective light reflected from an object after being output from the light output unit 110. The light input unit 120 may include, for example, circuitry to convert the received reflective light into an electrical signal. The light input unit 120 may, for example, include an image sensor including, for example, a Photo Diode (PD) or a Complementary Metal-Oxide Semiconductor (CMOS), or the like. In addition, the light input unit 120 may include, for example, a plurality of arrayed pixels. Each of the plurality of pixels may include, for example, an In Phase receiving unit and an Out Phase receiving unit. In this example, the In Phase receiving unit may refer, for example, to an input part which is activated to sense reflective light while a light source included in the light output unit emits light, and the Out Phase receiving unit may refer, for example, to an input part which is activated to sense the reflective light while the light source included in the light output unit does not emit light.

The controller 130 may be configured to control overall operations of the image photographing apparatus 100. For example, in response to first reflective light being input through the light input unit 120 as light output from the light output unit 110 so as to penetrate a projection was reflected from an object, the controller 130 may be configured to obtain a first image based on information of the first reflective light and to control the projection using predetermined information. In response to second reflective light being input through the light input unit 120 as output light that penetrated the controlled projection and is reflected from the object, the controller 130 may be configured to obtain a second image based on information of the second reflective light and to generate a depth map using the obtained first and second images.

For example, in response to the first reflective light being input through the light input unit 120 as light was output from the light output unit 110 to penetrate the projection and reflected from the object, the controller 130 may be configured to obtain the first image based on the information of the first reflective light. In this example, the information of the reflective light may include, for example, one or more of a pattern of the reflective light, a reflected position of the reflective light, and a time required for the reflective light to be input after being reflected from the object. In addition, the controller 130 may be configured to compare the information of the reflective light with a location, pattern, and a size of the projection to obtain an image.

The controller 130 may be configured to control a projection using the predetermined information. However, controlling the projection using the predetermined information is only an example, and the controller 130 may be configured to control the projection to correspond, for example to a received command (e.g., a user command).

The projection may be formed of a material having a shape that may be changed depending upon an electrical signal which flows on the projection (for example, a piezoelectric element). The controller 130 may be configured to control a shape of the projection by adjusting strength of the electrical signal in the projection. In addition, the controller 130 may be configured to divide the projection into a plurality of areas and to control each of the plurality of areas using, for example, a different electrical signal.

The projection may include, for example, a plurality of slits. The controller 130 may be configured to control the projection by adjusting one or more of a thickness of the plurality of slits and an angle of the projection for controlling an incident angle at which the output light falls into the plurality of slits.

The controller 130 may be configured to control the projection by moving a location of the projection. In addition, the controller 130 may be configured to control variation of the projection differently depending upon resolution of the light input unit 120. For example, in response to the resolution of the light input unit 120 being high (e.g., greater than a threshold resolution), the controller 130 may be configured to control the variation of the projection more minutely as compared with the low resolution (e.g., less than a threshold resolution).

Figure 2:
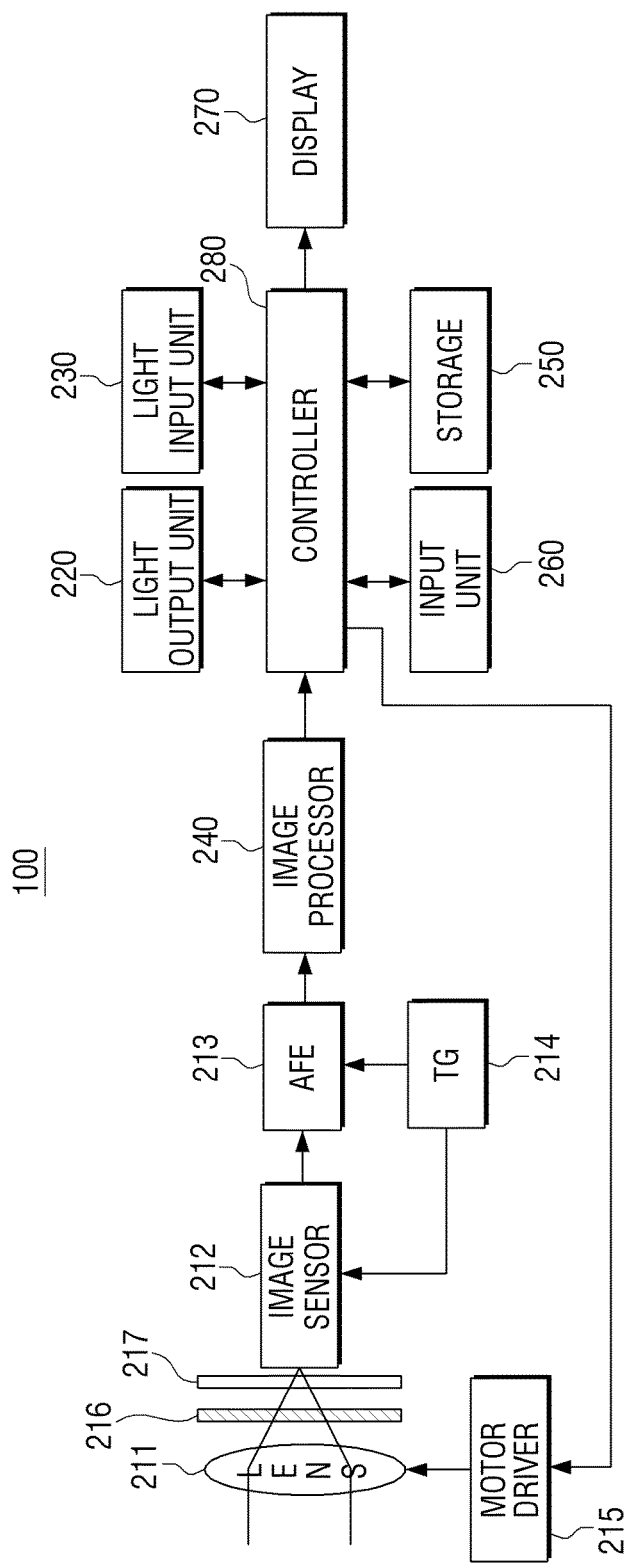
FIG. 2 is a block diagram illustrating an example structure of an image photographing apparatus.

Hereinafter, various example embodiments of the present disclosure will be described with reference to FIGS. 2 to 10. FIG. 2 is a block diagram illustrating an example structure of an image photographing apparatus 100. As illustrated in FIG. 2, the image photographing apparatus 100 may include a lens 211, an image sensor 212, an Analog Front End (AFE) 213, a Timing Generator (TG) 214, a motor driver 215, an aperture 216, a shutter 217, a controller (e.g., including processing circuitry) 280, an image processor (e.g., including processing circuitry) 240, a storage 250, an input unit (e.g., including input circuitry) 260, and a display (e.g., including a display panel and display driving circuitry) 270.

The lens 211 is a component in which light reflected from an object falls. The lens 211 includes one or more of a zoom lens for controlling a view angle to be narrowed or widen based on a focus distance and a focus lens for focusing on a subject. The lens 211 is housed in a body tube of the image photographing apparatus 100 and controls the focus by moving based on a driving signal of the motor driver 215. In addition, the body tube includes the shutter and the aperture, and each of the shutter and the aperture controls a quantity of light which falls into the lens 211 by the driving motor.

The image sensor 212 is a component where an image of a subject which passed through the lens 211 is formed. The image sensor 212 may include a plurality of pixels which are arrayed in a matrix form. The plurality of pixels may, for example, form a Bayer Pattern. Each of the plurality of pixels may accumulate a photocharge based on incident light and output an image based on the photocharge in a form of an electrical signal. The image sensor 212 may include the CMOS or may include a Charge-Coupled Device (CCD), or the like. According to an example embodiment, the plurality of pixels may include a plurality of phase difference pixels.

The image sensor 212 may include, for example, a Photo Diode (PD), a transmission transistor (TX), a reset transistor (RX), and a floating diffusion node (FD). The PD generates and accumulates a photocharge corresponding to an optical image of a subject. The TX transmits the photocharge generated by the PD to the FD in response to a transmission signal. The RX outputs the photocharge stored in the FD in response to a reset signal. In case of a Correlated Double Sampling (CDS) sensor, the CDS sensor performs a CDS processing operation. An Analogue-Digital Converter (ADC) converts a CDS-processed analog signal into a digital signal.

The AFE 213 samples and digitizes an electrical signal on the subject output from the image sensor 212. The AFE 213 may be controlled by the controller 280.

The TG 214 outputs a timing signal for reading out pixel data of the image sensor 212. The TG 214 may be controlled by the controller 280.

The AFE 213 and the TG 214 may be replaced with another component. For example, when the image sensor 212 is realized as a CMOS type, the AFE 213 and the TG 214 may be not necessary.

The motor driver 215 drives a focusing lens based on control of the controller 280 to control the focus.

The aperture 216 controls a quantity of light which is admitted in the image sensor 212. For example, the aperture 216 may control a caliber for controlling the quantity of the light which reaches the image sensor 212 through the body tube.

The shutter 217 controls a time that an image is formed in the image sensor 212. For example, the shutter 217 may allow the light to pass for a predetermined time through an operation of opening/closing the shutter 217. FIG. 2 illustrates that the image photographing apparatus 100 includes a mechanical shutter, but an electrical shutter which controls the image sensor 212 electrically may be used as an alternative.

In addition, FIG. 2 illustrates that the aperture 216 and the shutter 217 are separate components, but the aperture 216 and the shutter 217 may be realized as single component.

The light output unit (e.g., including light outputting circuitry) 220 outputs light. For example, the light output unit 220 outputs infrared (IR) light. The IR light may be light having a wavelength band greater than 800 nanometer (nm). The light output unit 220 may include at least one Laser Diode (LD) or Light Emitting Diode (LED) which projects the IR light. In addition, the light output unit 220 may modulate a pulse or a phase of outputted light, for example. Accordingly, the light output unit 220 may output light with switching on or off a light source in certain intervals. Meanwhile, the light output unit 220 may include a scanner for controlling an angle of light irradiated to an object. The light output unit 220 may rotate the scanner to irradiate light to a surface of an object.

The light input unit (e.g., including light receiving circuitry) 230 receives reflective light being formed as light outputted from the light output unit 220 was reflected from an object. The light input unit 230 may convert the received reflective light into an electrical signal. The light input unit 230 may be an image sensor including a Photo Diode (PD) or a Complementary Metal-Oxide Semiconductor (CMOS), or the like. In addition, the light input unit 230 may include a plurality of arrayed pixels. Each of the plurality of pixels may include an In Phase receiving unit and an Out Phase receiving unit. In this example, the In Phase receiving unit may refer, for example, to an input part which is activated to sense reflective light while a light source included in the light output unit emits light, and the Out Phase receiving unit may refer, for example, to an input part which is activated to sense the reflective light while the light source included in the light output unit does not emit light.

The image processor 240 image-processes raw image data under the control of the controller 280 and stores the processed image data in the storage 250. In addition, the image processor 240 transmits the image-processed data in the storage to the display 270.

In performing an autofocus operation using a phase difference, the image processor 240 may extract a signal for generating an image (signal being read out from a normal pixel) and a signal for determining a phase difference (signal being read out from a phase difference pixel) from among signals which were outputted from the image sensor 212 and sampled by the AFE 213, in order to perform the autofocus operation at high speed by rapidly determining the phase difference using the signal for determining a phase difference and generating an image, such as, a live view, in parallel.

However, the image photographing apparatus 100 according to the above-described example embodiments is not limited to the autofocus operation using a phase difference pixel. For example, the image photographing apparatus 100 according to the above-described example embodiments may further include a component for performing a contrast autofocus operation.

The image processor 240 processes raw image data and convert the data into YCbCr data. In processing the raw image data, a pixel defect of the raw image data may be corrected by a correction circuit (not shown). The correction circuit corrects the pixel defect based on a correction table, and the correction table may include an address of a defective pixel. A correction operation may be performed with respect to a pixel corresponding to the address, from adjacent pixels.

The image processor 240 may include an Optical Black (OB) clamping circuit (not shown) for determining a black level of an image. The image sensor 240 may have an OB area and detect an average value of a signal in the OB area to determine the black level based on a difference of each pixel value.

The image processor 240 may perform adjustment of sensitivity rate for each color by using a sensitivity rate control circuit (not shown). The sensitivity rate control circuit may control sensitivity of Red, Green, and Blue (RGB) colors under a standard light source. Generally, the sensitivity rate control circuit may fix a gain value of the G color to be 1 and control the sensitivity of the R and B colors to correspond to the gain value of the G color. In case of a still image, the image processor 240 may control the sensitivity rate and then output image data through an output buffer. In this example, an image is generated in an interlace method, and thus, it is unable to perform a post-processing operation immediately. However, in case of a live view image, the live view image is generated in a progressive method, and thus, it is able to perform a post-processing operation immediately.

The image processor 240 may perform a skip-readout operation of reading out a part of pixel lines and skipping the other pixel lines by using a vertical skip read-out circuit (not shown). Accordingly, the number of pixels of an raw image may be reduced.

The image processor 240 may control White Balance (WB) with respect to the image data by using a WB control circuit (not shown). Spectral distribution of illumination light varies depending upon a photographing environment, and thus, a white subject may not be displayed in white. Accordingly, a signal level may be adjusted by assigning different gain values to R, G, B pixels. Generally, a gain value of the G color may be fixed to be 1, and the signal levels of the R and B colors may be adjusted to correspond to the gain value of the G color.

The image processor 240 may perform gamma correction with respect to image data. According the gamma correction, gradation conversion corresponding to output of the display 270 may be executed.

The image processor 240 may generate a common color image signal having three colors for one pixel from a Bayer signal having one color for one pixel by using a color interpolation circuit (not shown).

The image processor 240 may perform color space conversion corresponding to the output and perform color compensation by using a color conversion/color correction circuit (not shown). According to the needs, a Look Up Table (LUT) may be used. After the color conversion/color correction, the image data is converted into YCbCr data.

The image processor 240 may convert resolution by using a resolution conversion circuit (not shown) to adjust a size.

The image processor 240 may process a spatial filter with respect to the image data by using a spatial filter circuit (not shown). In response to edge enhancement of a Y signal being performed, the image processor 240 may perform a Low Pass Filter (LPF) processing operation with respect to a Cb/Cr signal.

In addition, the image processor 240 may perform a skip-readout operation with respect to the Cb/Cr signal by using a CbCr skip-readout circuit (not shown) and convert the signal into image data of YCbCr 4:2:2. The image data may be outputted through an output buffer and recorded in the storage 250 through a bus.

In case of a still image, the readout operation may be performed in the interlace method. In this example, an adjacent pixel line does not exist, and thus, the image processor 240 is unable to perform the color interpolation directly. Accordingly, the image data may be stored in a progressive form by controlling an order of pixel lines in the storage 250 through the output buffer after a pre-processing operation is completed. The image data may be read out again and inputted into the image processor 240 through an input buffer.

The above example embodiment does not limit a processing operation of a still image to the interlace method, and the still image may be read out in the progressive method. In case of the still image, it is need to generate a preview image or thumbnail image which shows a photographed image in a small size. The preview image or thumbnail image is generated by omitting data of a part of pixels as in the skip-readout operation.

The image processor 240 may interpolate a phase difference pixel part into a normal pixel value by using an AF signal interpolation circuit (not shown). The phase difference pixel is located between normal pixels, and thus, using the part without change may cause deterioration of the resolution. Accordingly, the image processor 240 may perform interpolation by using an adjacent normal pixel.

A signal of the phase difference pixel divided by a division circuit (not shown) may be recorded in the storage 250 through a first bus. All of a plurality of pixels are read out and divided, and thus, each signal of the phase difference pixel signal may be accumulated in the storage 250 for a short time.

The stored signal of the phase difference pixel may be input to a phase difference calculation circuit (not shown) through the first bus. The phase difference calculation circuit may calculate a phase difference between the phase difference pixels and compute a moving direction and movement amount of a focus lens. The computed movement amount may be recorded in a register in the phase difference calculation circuit temporarily and read out by the controller 280 (that is, a Central Processing Unit (CPU)).

A JPEG codec may compress the YCbCr data. The compressed image data may be recorded in the storage 250. A procedure of generating an image may be completed as the controller 280 reads the compressed image data recorded in the storage 250 and records the image data in a memory card (not shown).

The storage 250 stores an image or is used in an imaging operation of the CPU. For example, the storage 250 may store images of a photographed subject, and the images are accumulated for each frame. In addition, the storage 250 may store an algorithm for recognizing a subject or store information for determining a main subject based on characteristic information on a subject.

According to an example embodiment, a Double Data Rate Synchronous Dynamic Random Access Memory (DDR SDRAM), or the like, may be used. The DDR SDRAM may perform an output operation at both of a leading edge and a falling edge of a system clock thereby increasing the output by two times than the output of only the leading edge.

As an example, the storage 250 may include a flash memory (not shown). In this example, the storage 250 may include a firmware program, various control information corresponding to a specification of the image photographing apparatus 100, setting information on the image photographing apparatus 100 based on a user input, a photographed image file, and the like.

As another example, the storage 250 may further include a memory card (not shown). In this example, the memory card may be detachable with respect to the image photographing apparatus 100. In addition, the memory card may store a photographed image file.

The input unit 260 receives an input (e.g., a user input). For example, the input unit 260 may include at least one button. In addition, the input unit 260 may be realized as a touch panel located in the display 270 to receive an input.

The at least one button (not shown) may be a push-type button or a touch-type button in a front surface, a side surface, or a rear surface of the image photographing apparatus 100. In addition, the at least one button may include at least one of a power/lock button, a shutter button, a menu button, a home button, a back button, and a search button, or the like. In response to a button of the input unit 260 being pressed, a signal corresponding to the pressed button is transmitted to the controller 280. The controller 280 may be configured to control the operations of the image photographing apparatus 100 based on the received signal.

The display 270 outputs image data. For example, the display 270 may display data being image-processed by the image processor 240.

The controller 280 may be configured to control overall components of the image photographing apparatus 100. The controller 280 includes, for example, a hardware element, such as a CPU or cache memory, and a software element of an application for performing a particular purpose. A control command for each component of the image photographing apparatus 100 may be read out of a memory according to a system clock, and an electrical signal may be generated according to the read control command to operate each component of hardware. For example, the controller 280 may be configured to generate a depth map using a plurality of obtained images. In addition, the controller 280 may be configured to control the image processor 240 to bring the focus out of the image data based on the generated depth map. The controller 280 may also be configured to control the display 270 to display the image data being image-processed by the image processor 240.

Hereinafter, a method for measuring or determining a distance between an image photographing apparatus and an object will be described with reference to FIGS. 3A-3C and 4. The method for measuring a distance between the image photographing apparatus 100 and an object may be roughly divided, for example, into a TOF method and a SL method.

Figure 3A:
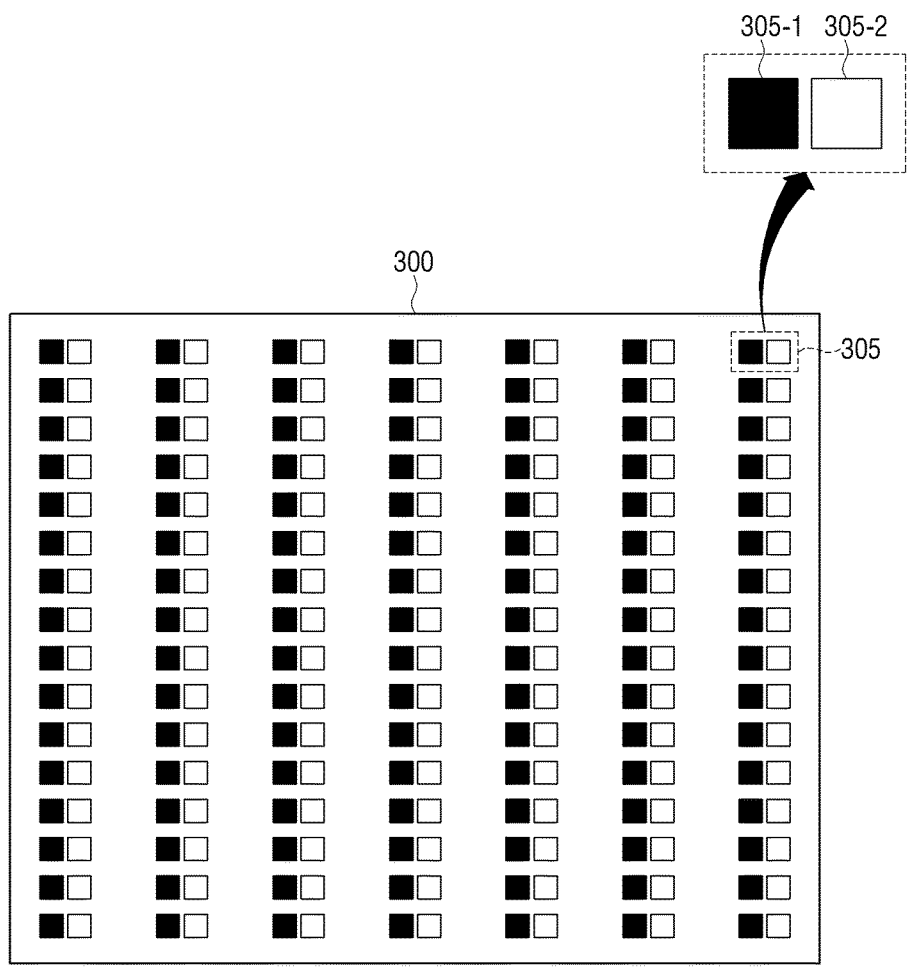
FIGS. 3A-3C and FIG. 4 are diagrams illustrating various example embodiments of generating a depth map.
Figure 3B:
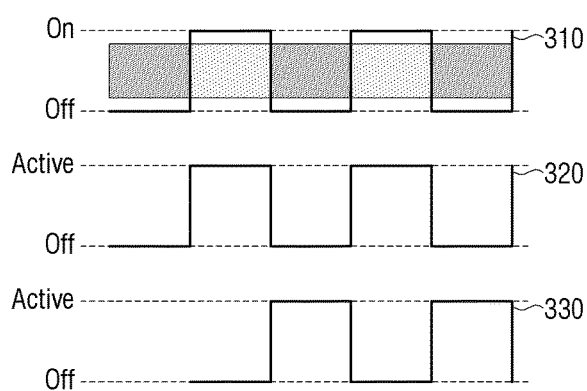
Figure 3C:
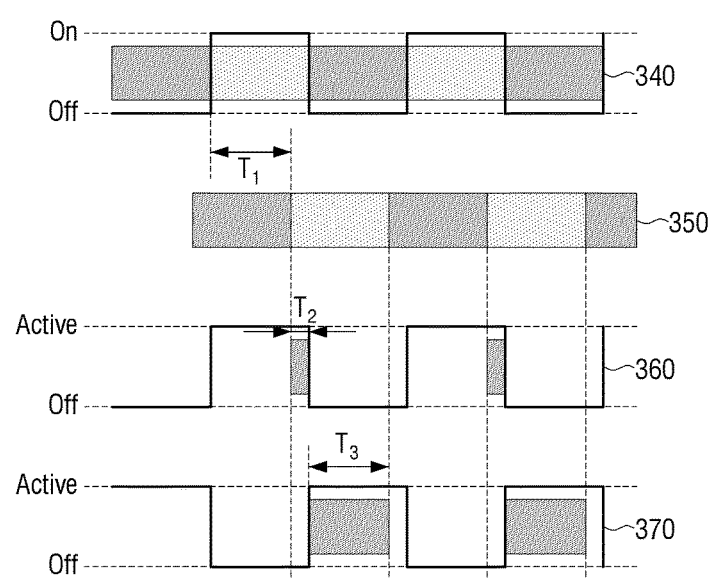

A detailed description on the TOF method is provided with reference to FIGS. 3A-3C. According to the TOF method, a time required for light to be output toward an object from the light output unit 220 and reflected from the object and then for reflective light to be input in the light input unit 230 is measured, the time is converted into a distance to measure a distance between an image photographing apparatus and an object. As illustrated in FIG. 3A, the light input unit 230 may include a plurality of arrayed pixels 305. Each of the plurality of arrayed pixels may include an In phase receiving unit 305-1 and an Out phase receiving unit 305-2.

Referring to FIG. 3B, reference numeral 310 represents activation of the light output unit 220, reference numeral 320 represents activation of the In phase receiving unit 305-1, and reference numeral 330 represents activation of the Out phase receiving unit 305-2. In this example, the activation of a receiving unit may signify that light is sensed. Accordingly, the In phase receiving unit 305-1 may be a receiving unit 320 which senses light while a light source of the light output unit 220 is turned on, and the Out phase receiving unit 305-2 may be a receiving unit which senses light while the light output unit 220 is turned off. As illustrated in FIG. 3B, the In phase receiving unit 305-1 and the Out phase receiving unit 305-2 may be activated alternately. In response to the In phase receiving unit 305-1 and the Out phase receiving unit 305-2 being activated with a time difference, a difference occurs in quantities of light received in the In phase receiving unit 305-1 and the Out phase receiving unit 305-2. As an example, in response to an object being located in front of the image photographing apparatus 100 (for example, the distance between the object and the image photographing apparatus 100 is 0 meter (m)), a time consumed for light output from the light output unit 220 to be input after being reflected from the object is 0 second (sec), and thus, a switching cycle of the light source is the same as a receiving cycle of the light. Accordingly, only the In phase receiving unit 305-1 may receive the reflective light, and the Out phase receiving unit 305-2 may do not receive the reflective light.

As another example, in response to an object being located to be spaced a certain distance apart from the image photographing apparatus 100, a certain time is consumed for the light outputted from the light output unit 220 to be input after being reflected from the object, and thus, the switching cycle of the light is different from the receiving cycle of the reflective light. Accordingly, as illustrated in FIG. 3C, a difference occurs in the quantities of the light received in the In phase receiving unit 305-1 and the Out phase receiving unit 305-2. Reference numeral 340 indicates that the light output unit 220 is activated, reference numeral 360 indicates that in phase receiving unit 305-1 is activated, and reference numeral 370 indicates that out phase receiving unit 305-2 is activated. For example, in response to the distance between the object and the image photographing apparatus 100 being 0 m, only the In phase receiving unit 305-1 receives light. In response to the distance between the object and the image photographing apparatus 100 gradually being increased, the quantity of the light received in the In phase receiving unit 305-1 decreases, and the quantity of the light received in the Out phase receiving unit 305-2 increases. For example, the quantities of the light received in the In phase receiving unit 305-1 and the Out phase receiving unit 305-2 vary depending upon the distance between the object and the image photographing apparatus 100. Accordingly, the controller 280 may be configured to determine the distance between the object and the image photographing apparatus 100 using the quantities of the light received in the In phase receiving unit 305-1 and the Out phase receiving unit 305-2. T1 and T3 indicates the time that the out phase receiving unit 305-2 senses light, and T2 indicates the time that the in phase receiving unit 305-1 senses light.

Figure 4:
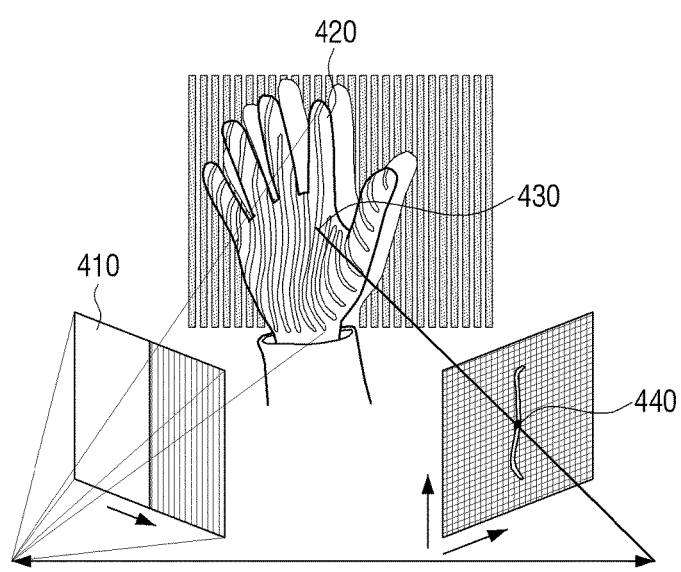

Hereinafter, a more detailed description on the SL method will be provided with reference to FIG. 4. According to the SL method, light is output from the light output unit 220 so as to penetrate a projection, and a distance between an object and the image photographing apparatus 100 is measured based on a pattern of the light input in the light input unit 230. For example, the light output unit 220 may output the light so as to penetrate the projection having slits in a pattern of a plurality of stripes or dots. The light input unit 230 may receive reflective light formed as the outputted light was reflected from the object. The controller 280 may be configured to determine the distance between the object and the image photographing apparatus 100 based on information on the reflective light input through the light input unit 230. For example, as illustrated in FIG. 4, the light output unit 220 may output light so as to penetrate a projection 410 having a plurality of stripe-patterned slits. In response to the output light being reflected from an object 420, the light input unit 230 may receive reflective light 440. The controller 280 may be configured to determine the distance between the object and the image photographing apparatus 100 based on a light pattern of the received reflective light, a reflected position of the received reflective light, and a detection time after reflection of the light.

Figure 5A:
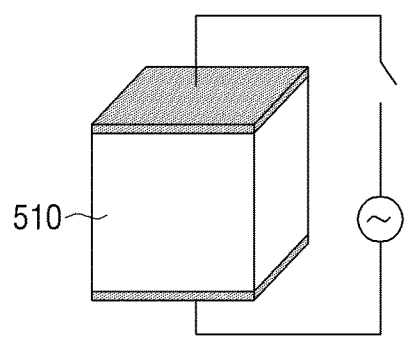
FIGS. 5A, 5B, 6, 7, 8A, 8B, 9 and 10 are diagrams illustrating various example embodiments of generating a high-resolution depth map.
Figure 5B:
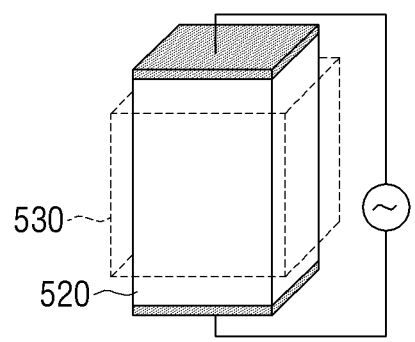

In this example, the projection may be formed of a material having a shape that can be changed depending upon strength of an electrical signal which flows on the projection. For example, the projection may be formed of a piezoelectric element. As illustrated in FIGS. 5A and 5B, in response to the strength of the electrical signal which flows on a piezoelectric element 510 being 0 or the electrical signal which flows on a piezoelectric element having a constant size, the piezoelectric element 510 maintains a certain shape. In this example, in response to an electrical signal in a different size being applied to the piezoelectric element, a shape of the piezoelectric element is changed from an original shape 530 to a changed shape 520, as illustrated in FIG. 5B.

Figure 6:
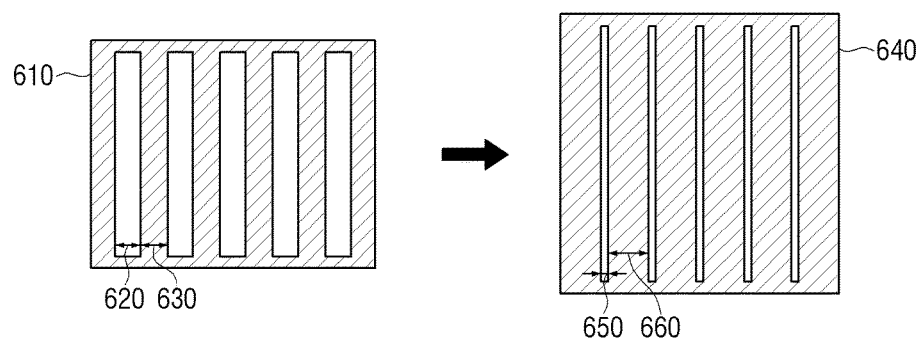
Figure 7:
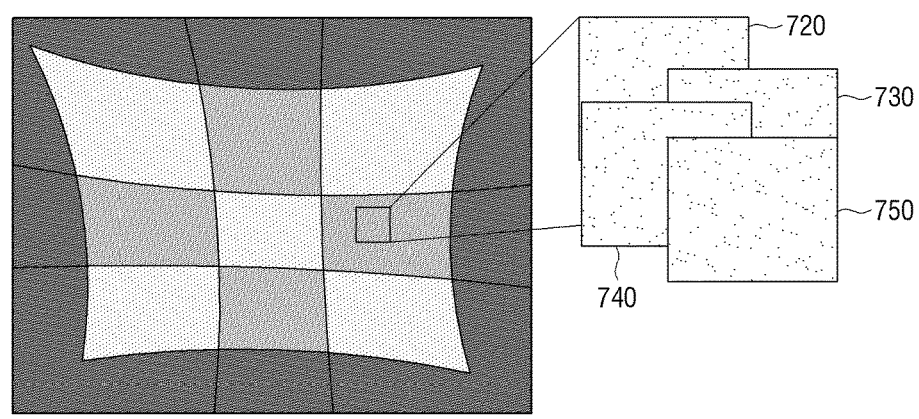

FIG. 6 illustrates a projection 610, 640 which is formed of a piezoelectric element according to an example embodiment. The controller 280 may be configured to vary the strength of the electrical signal which flows on the projection 610 to change the projection 610 to the projection 640 having a shape that has been controlled. For example, the controller 280 may be configured to control the strength of the electrical signal which flows on the projection 610, 640 formed of the piezoelectric element in certain intervals based on predetermined information. For example, when different strength of electric signals are applied to the projection 610, the projection 610 may be adjusted to a projection 640 having a shape that a width of a slit gets narrowed from 620 to 650. In addition, the controller 280 may be configured to obtain a plurality of images corresponding to the projections where the electrical signals in different strength flow For example, as illustrated in FIG. 7, the controller 280 may be configured to obtain a plurality of images 720, 730, 740, 750 corresponding to the strength of each electrical signal which flows on the projection. In addition, the controller 280 may be configured to control the projection based on the resolution of the light input unit 230. For example, in response to the resolution of the light input unit 230 being high (e.g., greater than a threshold value), the controller 280 may be configured to control variation of the projection minutely in a relatively greater number of times to obtain a large number of images. In response to the resolution of the light input unit 230 being low (e.g., less than a threshold value), the controller 280 may be configured to control the variation of the projection to be relatively high to obtain a few number of images. In response to the resolution of the light input unit 230 being low, the light input unit 230 may not receive minute variation even though the controller 280 is configured to control the variation of the projection minutely.

In response to a command (e.g., a user command) being received, the controller 280 may be configured to control the projection to correspond to the received command.

Figure 8A:
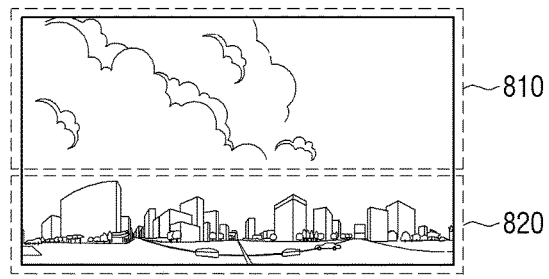
Figure 8B:
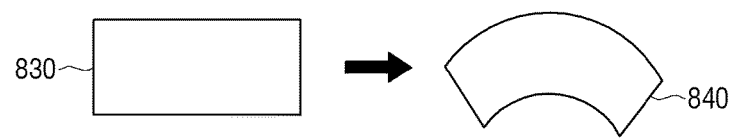

In response to a high-resolution depth map being required for a part of areas of an object and the high-resolution depth map not being required for the other part of areas of the object, the controller 280 may be configured to divide the projection into a plurality of areas and apply the electrical signals in different strength to each of the plurality of areas to control the projection. For example, as illustrated in FIG. 8A, a first area 810 of an object is the sky, and thus, the high-resolution depth map is not required. However, a second area 820 of the object is an area where a plurality of subjects are concentrated, and thus, the high-resolution depth map is required. In this example, as illustrated in FIG. 8B, the controller 280 may be configured to apply different electrical signals to an upper area and a lower area of a projection 830 and obtain an image using the controlled projection 830. The slits of the upper area of the controlled projection 840 have a broad space, and the slits of the lower area of the controlled projection 840 have a narrow space. Accordingly, it is able provide the second area 820 of the object with the relatively high-resolution depth map.

Figure 9:
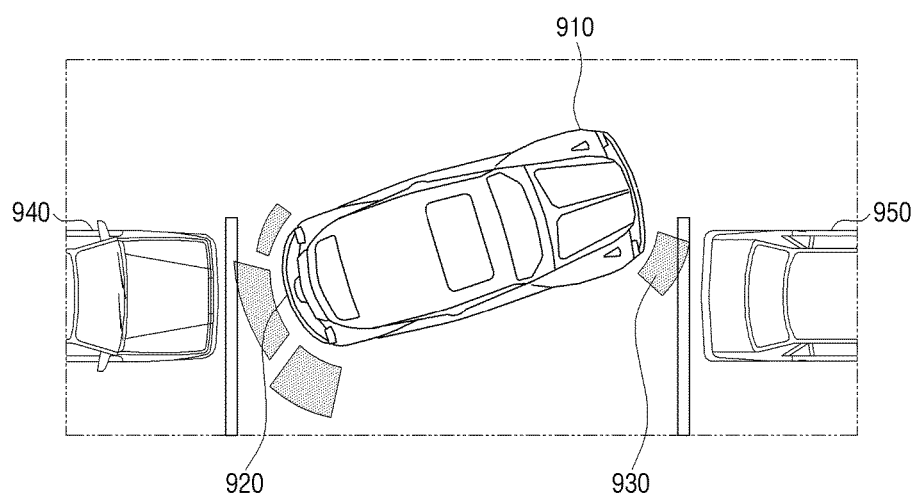
Figure 10:
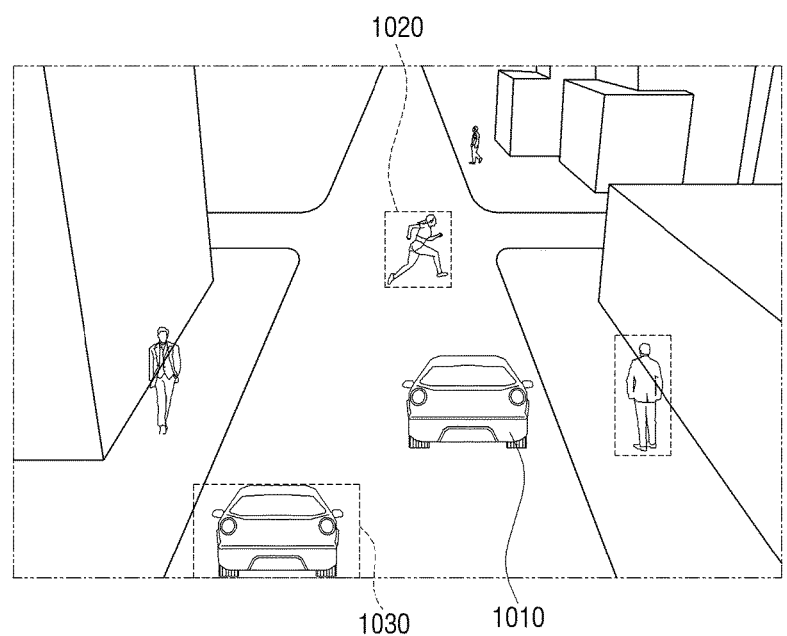

According to another example embodiment, an image photographing apparatus 100 may be mounted on an electrical device of a vehicle. As illustrated in FIGS. 9 and 10, in response to the image photographing apparatus 100 being mounted on an electrical device of a vehicle 910 and in response to determining that a distance between the vehicle 910 and an adjacent vehicle 940, 950 is shorter that a certain distance in an automatic parking mode, the image photographing apparatus 920, 930 may output an alarm sound. In addition, in response to the image photographing apparatus 100 being mounted on an electrical device of a vehicle 1010, the image photographing apparatus 100 may determine a distance between the vehicle 1010 and an adjacent object, such as, a person 1020 or a vehicle 1030, in a driving mode. In response to determining that the distance between the vehicle 1010 and the adjacent object is shorter than a certain distance, the image photographing apparatus 100 may output an alarm sound.

Figure 11:
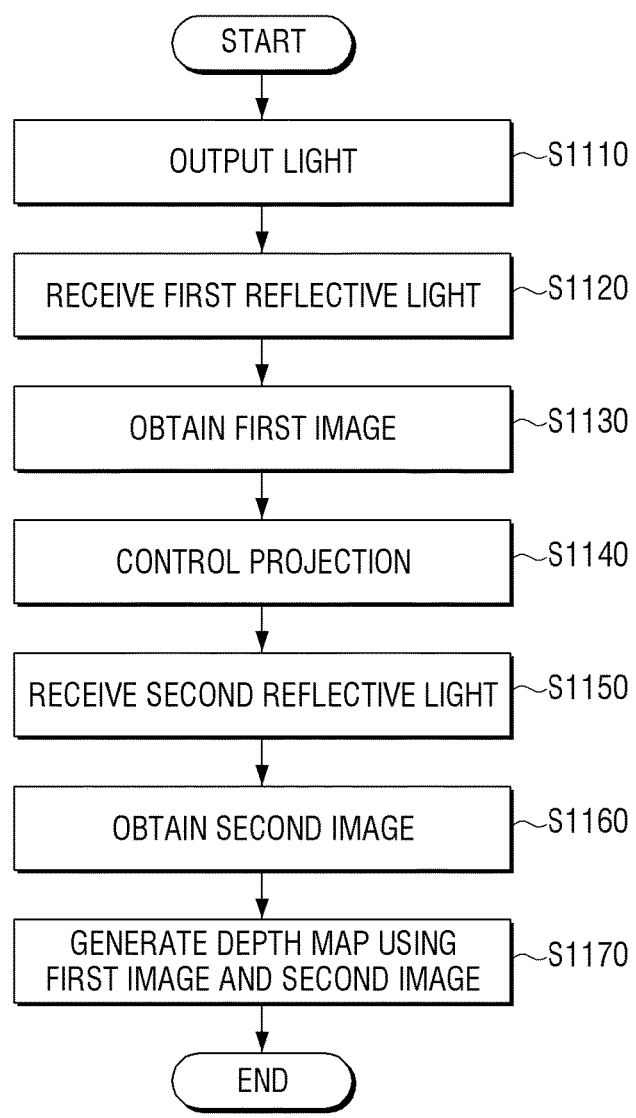
FIG. 11 is a flowchart illustrating an example method for controlling an image photographing apparatus.

Hereinafter, a method for controlling an image photographing apparatus 100 according to an example embodiment will be described in greater detail with reference to FIG. 11.

The image photographing apparatus 100 outputs light so as to penetrate a projection in operation S1110.

Subsequently, the image photographing apparatus 100 receives first reflective light formed as the output light was reflected from an object in operation S1120.

The image photographing apparatus 100 obtains a first image based on information of the received first reflective light in operation S1130. For example, the image photographing apparatus 100 may obtain the first image by comparing the information of the received first reflective light with a location, pattern, and size of the projection.

The image photographing apparatus 100 controls the projection using predetermined information in operation S1140. For example, the projection may be formed of a material having a shape that may be changed depending upon strength of an electrical signal which flows on the projection. The image photographing apparatus 100 may control a shape of the projection by adjusting the strength of the electrical signal which flows on the projection. In addition, the image photographing apparatus 100 may divide the projection into a plurality of areas and control the strength of the electrical signal which flows on the projection to control a shape of the projection.

The image photographing apparatus 100 may receive second reflective light using the controlled projection in operation S1150.

The image photographing apparatus 100 obtains a second image based on information of the second reflective light in operation S1160. For example, the image photographing apparatus 100 may obtain the second image by comparing the information of the received second reflective light with a location, pattern, and size of the controlled projection.

The image photographing apparatus 100 generates a depth map using the obtained first and second images in operation S1170.

According to the above-described various example embodiments, the image photographing apparatus 100 may generate a high-resolution depth map by obtaining a plurality of images through control of a projection and interpolating the plurality of images.

Various applications or programs described above may be stored and provided in a non-transitory computer readable medium such as a compact disc (CD), a digital versatile disk (DVD), a hard disk, a Blu-ray disk, a universal serial bus (USB), a memory card, a read-only memory (ROM), or the like.

As above, example embodiments have been illustrated and described. The foregoing example embodiments and advantages are merely exemplary and are not to be construed as limiting the present disclosure. The present teaching can be readily applied to other types of devices. Also, the description of the example embodiments is intended to be illustrative, and not to limit the scope of the claims, and many alternatives, modifications, and variations will be apparent to those skilled in the art.

What is claimed is:

1. A method for controlling an image photographing apparatus, the method comprising:
   outputting light so as to pass through a projection and be incident on an object;
   receiving first light reflected from the object after passing through the projection;
   obtaining a first image based on information of the first reflected light;
   controlling the projection using predetermined information to generate a controlled projection through which the output light passes and falls on the object;
   receiving second light reflected from the object after passing through the controlled projection;
   obtaining a second image based on information of the second reflected light; and
   generating a depth map using the obtained first image and the obtained second image.

2. The method as claimed in claim 1, wherein the projection comprises a material having a shape capable of being changed depending upon an electrical signal, wherein the controlling of the projection comprises controlling a shape of the projection by adjusting a strength of an electrical signal supplied to the projection.

3. The method as claimed in claim 2, wherein the controlling of the projection comprises supplying different electrical signals to different areas of the projection.

4. The method as claimed in claim 1, wherein the controlling of the projection comprises minutely controlling variation of the projection as resolution of a light input unit is greater than a threshold resolution.

5. The method as claimed in claim 1, wherein the obtaining of the first image comprises obtaining the first image by comparing the information of the first reflected light with a location, pattern, and size of the projection,
wherein obtaining the second image comprises obtaining the second image by comparing the information of the second reflected light with a location, pattern, and size of the controlled projection.

6. The method as claimed in claim 1, wherein the controlling of the projection comprises controlling the projection to correspond to a received command for controlling the projection.

7. The method as claimed in claim 1, wherein the information of the first reflected light comprises one or more of a pattern of the first reflected light, a reflected position of the first reflected light, and a time required for the first reflected light to be input after being reflected from the object.

8. The method as claimed in claim 1, wherein the controlling of the projection comprises moving a location of the projection.

9. The method as claimed in claim 1, wherein the projection comprises a plurality of slits,
wherein the controlling of the projection comprises controlling the projection by adjusting one or more of a width of the plurality of slits and an angle of the projection for controlling an incident angle at which the output light is incident on the plurality of slits.

10. The method as claimed in claim 1, wherein the light is infrared (IR) light.

11. An image photographing apparatus comprising:
a light output unit comprising light output circuitry, the light output unit configured to output light so as to pass through a projection and be incident on an object;
a light input unit comprising light receiving circuitry, the light input unit configured to receive first light reflected from an object after passing through the projection and to receive second light reflected from the object after passing through a controlled projection; and
a controller configured to obtain a first image based on information of the first reflected light, to control the projection using predetermined information to generate the controlled projection, to obtain a second image based on information of the second reflected light, and to generate a depth map using the obtained first image and second image.

12. The apparatus as claimed in claim 11, wherein the projection comprises a material having a shape capable of being changed depending upon an electrical signal,
wherein the controller is configured to control a shape of the projection by adjusting a strength of an electrical signal supplied to the projection.

13. The apparatus as claimed in claim 12, wherein the controller is configured to supply different electrical signals to different areas of the projection.

14. The apparatus as claimed in claim 11, wherein the controller is configured to control variation of the projection minutely as resolution of a light input unit is greater than a threshold resolution.

15. The apparatus as claimed in claim 11, wherein the controller is configured to obtain the first image by comparing the information of the first reflected light with a location, pattern, and size of the projection and to obtain the second image by comparing the information of the second reflected light with a location, pattern, and size of the controlled projection.

16. The apparatus as claimed in claim 11, wherein the controller is configured to control the projection to correspond to a received command for controlling the projection.

17. The apparatus as claimed in claim 11, wherein the information of the first reflected light comprises one or more of a pattern of the first reflected light, a reflected position of the first reflected light, and a time required for the first reflected light to be input after being reflected from the object.

18. The apparatus as claimed in claim 11, wherein the controller is configured to move a location of the projection.

19. The apparatus as claimed in claim 11, wherein the projection comprises a plurality of slits,
wherein the controller is configured to control the projection by adjusting one or more of a width of the plurality of slits and an angle of the projection for controlling an incident angle at which the output is incident on the plurality of slits.

20. The apparatus as claimed in claim 11, wherein the light is infrared (IR) light.

* * * * *